April 14, 1964     W. H. SMOLENSKI     3,128,499
MOLDING APPARATUS

Filed June 15, 1961     2 Sheets-Sheet 1

INVENTOR
W. H. SMOLENSKI
BY
ATTORNEY

April 14, 1964 W. H. SMOLENSKI 3,128,499
MOLDING APPARATUS
Filed June 15, 1961 2 Sheets-Sheet 2

INVENTOR
W. H. SMOLENSKI
BY
ATTORNEY 3,128,499
MOLDING APPARATUS
Wilfried H. Smolenski, Indianapolis, Ind., assignor to Western Electric Company, Incorporated, a corporation of New York
Filed June 15, 1961, Ser. No. 117,206
1 Claim. (Cl. 18—2)

This invention relates to molding apparatus, and more particularly to molding apparatus in which air jets are provided within the structure of the molding dies for removing residue material from between the dies after a molding operation. It is an object of this invention to provide improved apparatus of this character.

This invention is particularly applicable to molding apparatus which includes opposed relatively movable upper and lower molding dies having mating parting faces and mold and runner cavities opening into the parting face of the lower die. The molding apparatus further includes suitable material removing mechanism, such as racks, combs and/or trays, which is operative after a molding operation to remove molded articles and runners from between the dies and out the opposite side of the dies into a suitable material receiving means.

In conventional molding apparatus of this type, the material removing mechanism sometimes is not effective to remove all of the molded articles and the runners from between the molding dies. In this regard, articles, runners, and scraps of flash material which break off of the molded assembly, often fall onto the parting face of the lower die during the operation of the material removing mechanism. This material, referred to herein as residue material, prevents proper mating of the dies in a subsequent operation of the machine and frequently damages the dies. Where automatic mechanism is employed for removing the molded assembly, it is frequently a serious problem to locate any supplementary apparatus for clearing away residue material such that it is effective and yet does not interfere with the basic mechanism which is provided to remove the molded assembly.

Accordingly, another object of this invention is to provide improved molding apparatus including opposed relatively movable molding dies in which removal of residue material from between the molding dies after a molding operation substantailly is insured.

A further object of this invention is to provide for the conversion of conventional commercial molding apparatus, including opposed relatively movable molding dies, in a simple and economical manner whereby material is removed efficiently from between the molding dies upon completion of a molding operation, without interfering with the normal operation of the apparatus, and without addition of costly parts, rearrangement of existing parts, or substitution of new parts for existing parts.

In accordance with the preferred embodiment of the invention, air jets are provided, supplementing the material removing mechanism, for the removal of residue material from between the molding dies, particularly in the vicinity of the mold cavities, whereby upon closure of the dies the parting faces thereof will mate properly for molding, and the dies will not be damaged. The problem of locating the air jets so as to be effective for this purpose is solved in accordance with the present invention by mounting the air jets within the die structure itself. More specifically, the dies are arranged with the air jets mounted within one of the dies, preferably adjacent the side of the dies opposite from the material receiving means so that any residue material removed by the jets will be caught by the material receiving means. The air jets are arranged to direct air blasts toward the material receiving means so that portions of the air blasts are directed across those portions of the parting face of the lower die adjacent the mold and runner cavities to clear material from between the dies into the material receiving means. In this unique manner, conventional commercially available molding apparatus is readily adapted to provide for material to be cleared effectively from between the molding dies of the apparatus after each molding operation, without interfering with the operation of the material removing mechanism.

This invention, together with further objects and advantages thereof, will best be understood with reference to the following detailed description taken in connection with the accompanying drawings in which.

Figure 1:
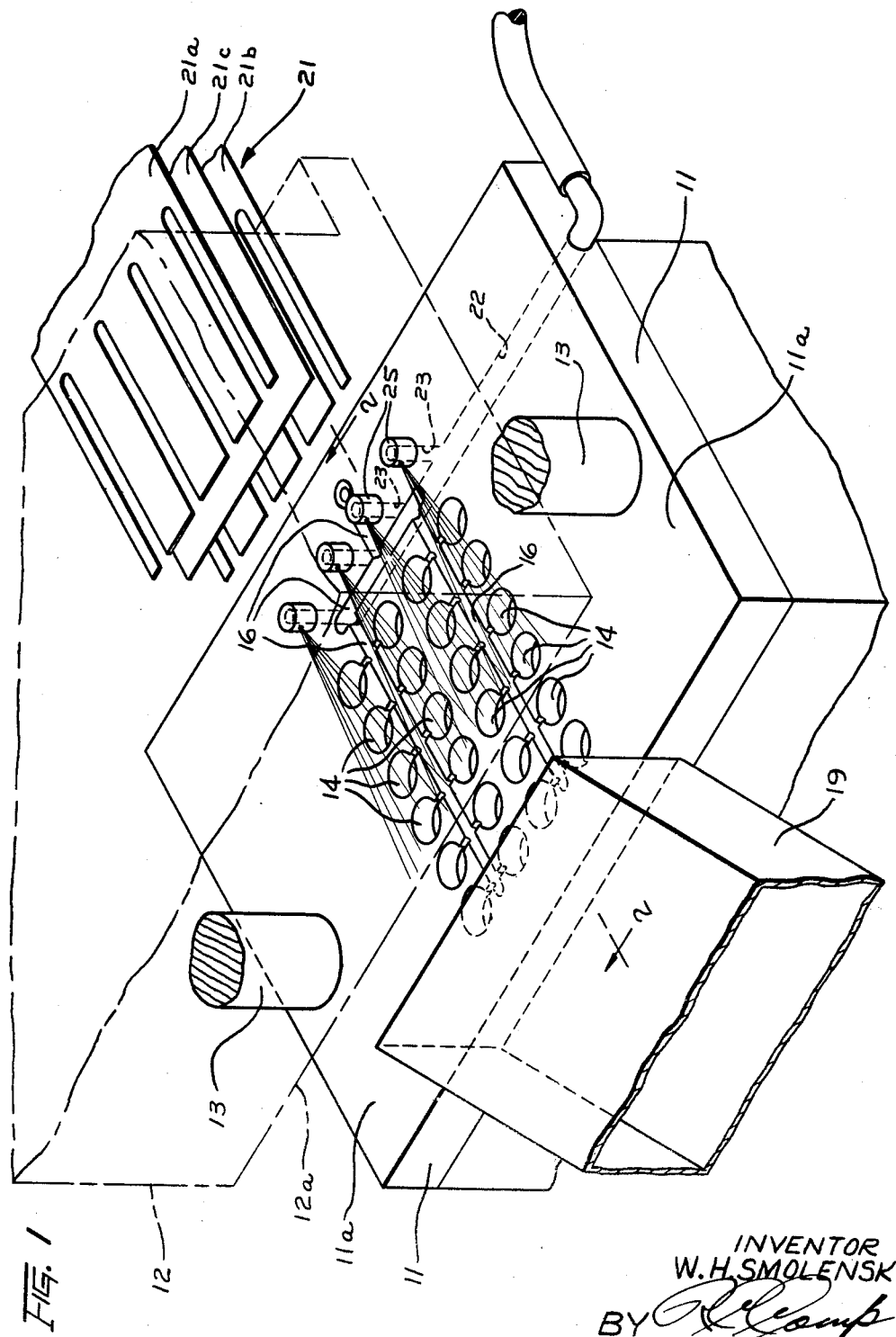
FIG. 1 is an isometric view of molding apparatus illustrating an embodiment of this invention.
Figure 2:
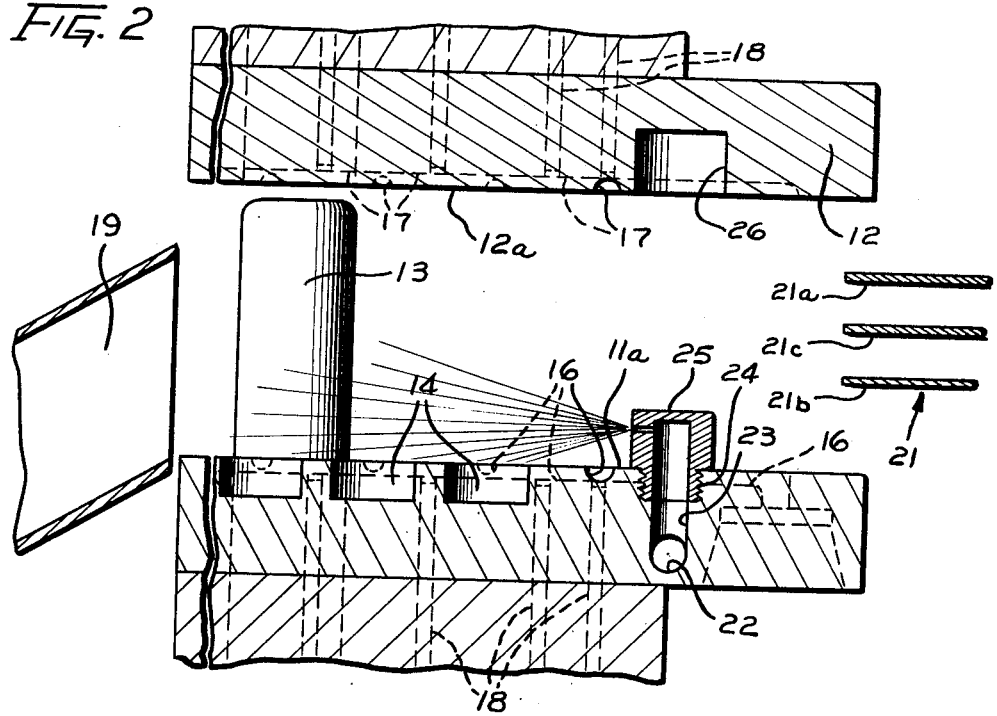
FIG. 2 is a cross-sectional view taken substantially along the line 2—2 of FIG. 1.

Referring to FIGS. 1 and 2 of the drawings, this invention is illustrated as being applied to conventional molding apparatus including a lower molding die 11 and an upper molding die 12, the molding dies being carried on upper and lower platen (not shown) movable toward and away from one another on suitable guide shafts (not shown). The molding dies further include parting faces 11a and 12a designed to substantially mate with one another when the dies are moved to a closed molding position. The lower molding die 11 is provided with upstanding guide pins 13 receivable in apertures in the upper molding die 12 for insuring proper vertical alignment of the dies in their closed position, a plurality of mold cavities 14, and a runner cavity system 16, and the upper molding die 12 also is shown as including a runner cavity system 17 (FIG. 2) which substantially corresponds to the runner cavity system 16 of the lower die and which cooperates therewith to conduct material to be molded to the mold cavities 14.

When a molding operation is completed and the dies 11 and 12 are opened, molded articles and runners are removed from the mold cavities 14 and the runner systems 16 and 17 to a position between the molding dies by knockout members 18 mounted for vertical movement in the upper and lower dies in vertical alignment with portions of the runner systems 16 and 17. The knockout members 18 are moved vertically for this purpose, into the space between the open dies, by any suitable mechanism (not shown).

At the left-hand side of the apparatus, as viewed in FIGS. 1 and 2, a material receiving discharge chute 19 is mounted in any suitable manner. At the right-hand side of the apparatus, as viewed in FIGS. 1 and 2, is a suitable article removing mechanism 21 of a type well known to those skilled in the art. For example, this article removing mechanism may include upper and lower combs 21a and 21b movable between the molding dies for stripping molded material from the knockout members 18, a tray member 21c mounted between the upper and lower combs and movable therewith for receiving the material stripped from the knockout members of the upper die by the upper comb, and may further include scraper members (not shown) movable between the tray member and the combs for scraping material therefrom and into the discharge chute 19.

During the operation of the article removing mechanism 21, residue material in the form of articles, runners, or scraps of flash material which break off of the articles and runners, may fall from the article removing mechanism onto the parting face 11a of the lower molding die, whereby upon closing of the dies for a subsequent molding operation, the parting faces of the dies will clampingly engage on the residue material, resulting in possible damage to the dies and thus increasing maintenance.

Generally, in conventional molding apparatus, the article removing mechanism 21 is so arranged at its respective side of the dies that if any additional structure, as for example air jets, is mounted at this side of the dies for supplementing the article removing mechanism in the removal of the residue material from between the dies, the air jets will interfere with the operation of the article removing mechanism. Further, air jets mounted at other points externally of the dies are not effective for removing material from between the dies and into the discharge chute 19.

The problem of locating air jets so as to be effective to remove material from between the molding dies 11 and 12 and into the discharge chute 19, without interfering with the material removing mechanism, is solved according to the present invention by mounting the air jets within the die structure itself. For example, as shown in FIGS. 1 and 2 a horizontally extending bore 22 is drilled in the lower molding die 11 adjacent the side of the dies at which the material removing mechanism 21 is mounted, and is connected to a suitable supply of compressed air (not shown). Laterally spaced and vertically extending bores 23, which open into the horizontal bore 22, are drilled in the lower die 11 at points adjacent the material removing mechanism 21 and spaced from the mold and runner cavities 14, 16. Threaded bores 24 (FIG. 2) are formed in the lower die coaxial with respective ones of the vertical bores 23, and air jets 25 of a suitable conventional type are threaded into the bores 24 and in communication with the vertical bores 23, whereby the vertical bores 23 and the horizontal bore 22 comprise an air supply system for supplying air to the air jets 25. As the air jets 25 project above the parting face 11a of the lower die, the upper molding die 12 is provided with suitable recesses 26 (FIG. 2) for receiving the air jets, to allow closing of the mold dies for a molding operation.

The air jets 25 are arranged so that air blasts therefrom are directed toward the discharge chute 19 and so that portions of the air blasts are directed across the parting face 11a of the lower molding die 11 adjacent the mold and runner cavities thereof, whereby when the dies are opened after a molding operation, the air jets are effective to blow material from the parting face 11a into the discharge chute 19. Thus, when the molding dies 11 and 12 are closed for a subsequent molding operation, the parting faces of the dies will mate properly and the dies will not be damaged by material not removed from between the dies by the article removing mechanism 21. Operation of the air jets for this purpose may be initiated in any suitable manner, which forms no part of this invention, and which therefore is not described in detail.

Figure 3:
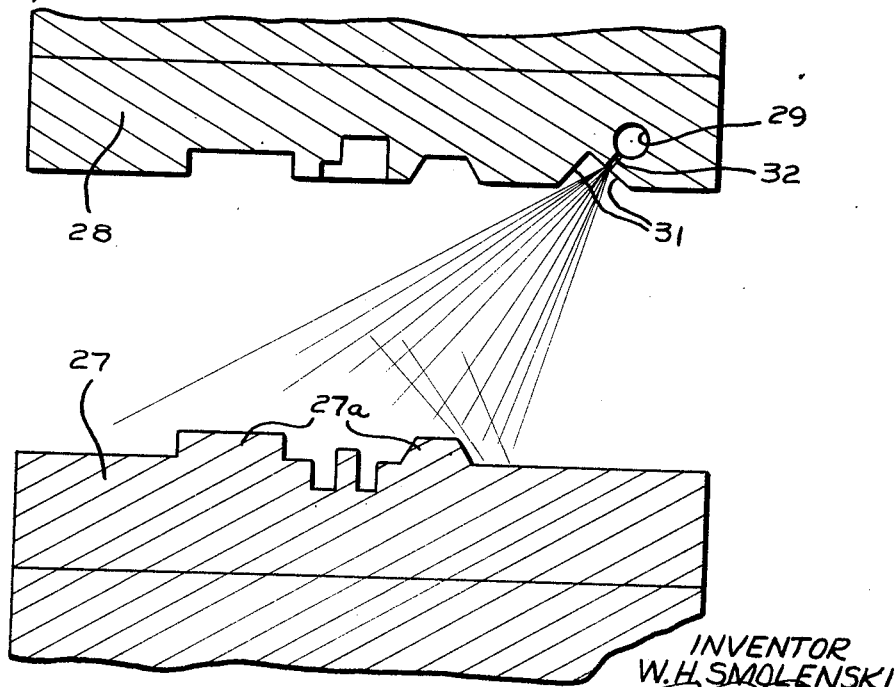
FIG. 3 is a cross-sectional view similar to FIG. 2, but illustrating another embodiment of this invention.

FIG. 3 shows the present invention as applied to conventional molding apparatus including a lower molding die 27 and an upper molding die 28, in which apparatus the lower molding die 27 includes portions 27a which project upwardly with respect to the parting face thereof, whereby an air jet arrangement in the lower molding die, as shown in FIGS. 1 and 2, would be relatively ineffective to dislodge material from behind the upwardly projecting portions. In the application of the invention as shown in FIG. 3, a horizontal bore 29, corresponding to the horizontal bore 22 in FIGS. 1 and 2, is drilled in the upper die 28 and connected to a suitable supply of compressed air (not shown). Further, the upper molding die 28 is provided with a plurality of laterally spaced recesses 31, and holes 32 are drilled through a face of each recess to form air jets having exit apertures opening into the recesses and having entrance apertures opening into the horizontal bore 29. The forming of the air jets 32 in the upper molding die so that the exit apertures thereof open into the recesses 31 helps prevent clogging of the air jets by flash or other material. As is illustrated in FIG. 3, the air jets 32 are arranged so that they direct air blasts obliquely downward toward the lower molding die 27, whereby portions of the air blasts are directed across those portions of the parting face of the lower die adjacent the projecting portions 27a when the dies are opened after a molding operation, to remove material from the parting face and into the discharge chute 19.

It has now been shown that a molding apparatus of conventional design, which includes automatic material removing mechanism for removing molded assemblies from the apparatus, may be provided with supplemental structure for effectively removing residue material from between the molding dies, without interfering with the operation of the material removing mechanism. More particularly, the mounting of the air jets within the structure of the molding dies makes it possible to locate the air jets so that the material removing mechanism can operate in its normal manner without any redesigning thereof. In this regard, to apply applicant's invention as shown in FIGS. 1 and 2, the only modification of the molding apparatus required is the drilling and threading of several holes in the lower die for mounting the air jets therein, the drilling of several holes in the lower die for supplying air to the air jets, and the drilling of several recesses in the upper die for receiving the air jets when the dies are closed. Similarly, in the application of the invention shown in FIG. 3, the only modification required is the forming of the recesses 29 in the upper mold die 28, and the drilling of several holes to form the air jets 28, and a common air line for the air jets. Thus, it is apparent that a conventional molding apparatus can be converted to incorporate the present invention inexpensively without interfering with the normal operation of the apparatus, and without substantial redesigning of the apparatus.

While certain embodiments of the invention have been disclosed many modifications will be apparent, and it is intended that the invention be interpreted as including all modifications which fall within the true spirit and scope of the invention.

What is claimed is:

In molding apparatus including opposed relatively movable upper and lower dies, said dies having substantially flat parting faces designed to mate with one another when the dies are in a closed molding position and including mold and runner cavities opening into one of the parting faces, ejecting means for removing material from the mold and runner cavities into positions between the dies when the dies move to an open position, means at one side of the dies for receiving material, and material removing mechanism mounted at the opposite side of the dies and movable between the dies when the dies are in their open position, for removing material from between the dies and into the receiving means, the improvement which comprises, air jet means projecting from the parting face of one of the dies within the peripheral limits of the parting face, said air jet means being spaced from the mold and runner cavities in a direction away from the material receiving means and being arranged to direct air blasts toward the receiving means so that portions of the air blasts are directed substantially parallel to the parting face of the lower die to remove any material remaining between the dies after the operation of the material removing mechanism into the receiving means, the other die being provided with recesses in its parting face for receiving said projecting air jets upon the movement of the dies to their closed position.

References Cited in the file of this patent

UNITED STATES PATENTS

| | | |
|---|---|---|
| 2,148,084 | Nock | Feb. 21, 1939 |
| 2,297,596 | Westin | Sept. 29, 1942 |
| 2,442,338 | Borkland | June 1, 1948 |
| 2,444,339 | Dinzl | June 29, 1948 |
| 2,582,891 | Strauss | Jan. 15, 1952 |
| 2,710,988 | Willcox et al. | June 21, 1955 |
| 3,040,378 | Rodgers et al. | June 26, 1962 |